(12) United States Patent
Akita

(10) Patent No.: US 6,896,797 B2
(45) Date of Patent: May 24, 2005

(54) SAMPLE SUPPLY APPARATUS FOR SIMULATED MOVING BED CHROMATOGRAPHIC DEVICE

(75) Inventor: Kazuyuki Akita, Arai (JP)

(73) Assignee: Daicel Chemical Industries, Ltd., Osaka (JP)

( * ) Notice: Subject to any disclaimer, the term of this patent is extended or adjusted under 35 U.S.C. 154(b) by 58 days.

(21) Appl. No.: 10/283,257

(22) Filed: Oct. 30, 2002

(65) Prior Publication Data

US 2003/0089649 A1 May 15, 2003

(30) Foreign Application Priority Data

Oct. 30, 2001 (JP) ........................................ 2001-333568

(51) Int. Cl.⁷ .............................................. B01D 15/08
(52) U.S. Cl. .................... 210/104; 73/61.56; 210/198.2; 210/257.1; 210/264; 222/56; 422/70
(58) Field of Search .......................... 210/86, 97, 104, 210/137, 198.2, 257.1, 263, 264, 656; 137/112, 113, 571, 572, 255, 256; 422/70; 73/61.55, 61.56; 222/56, 64–67, 136

(56) References Cited

U.S. PATENT DOCUMENTS

| | | | |
|---|---|---|---|
| 5,383,574 A | | 1/1995 | Raphael |
| 5,531,106 A | | 7/1996 | Lyon et al. |
| 5,551,309 A | * | 9/1996 | Goossens et al. ............. 73/863 |
| 5,630,943 A | * | 5/1997 | Grill .......................... 210/659 |
| 5,755,561 A | * | 5/1998 | Couillard et al. ........... 417/246 |

FOREIGN PATENT DOCUMENTS

| | | |
|---|---|---|
| EP | 0477811 A2 | 4/1992 |
| EP | 0863385 A1 | 9/1998 |
| FR | 2230978 A | 12/1974 |

* cited by examiner

*Primary Examiner*—Joseph Drodge
(74) *Attorney, Agent, or Firm*—Birch, Stewart, Kolasch & Birch, LLP

(57) ABSTRACT

A simulated moving bed connected with a sample supply apparatus is constructed such that a sample liquid can be supplied continually to a simulated moving bed separation device without causing any problems due to a penetration of gas phase and admixture of the plurality of sample liquids. At this end, the sample supply apparatus is composed of a plurality of sample supply vessels each with a sample liquid passageway disposed thereto, a sample liquid-amount management vessel for storing a sample to be supplied from the sample supply vessels through the sample liquid passageways and the supplying sample liquid through the liquid-amount management vessel to the simulated moving bed chromatographic device. The apparatus also has a control for alternatingly opening and closing opening-closing devices in the sample supply vessels in response to liquid levels in the sample liquid-amount management vessel.

9 Claims, 2 Drawing Sheets

SAMPLE SUPPLY APPARATUS FOR SIMULATED MOVING BED CHROMATOGRAPHIC DEVICE

This nonprovisional application claims priority under 35 U.S.C. § 119(a) on Patent Application No. 2001-333568 filed in Japan on Oct. 30, 2001, which is herein incorporated by reference.

TECHNICAL FIELD

The present invention relates to a sample supply apparatus for a simulated moving bed chromatographic device and, more particularly, to a sample supply apparatus for supplying a sample to a simulated moving bed chromatographic device, which enables a strict management of a history of lots of the production of raw materials and which causes no penetration of gas phase thereinto.

BACKGROUND ART

Recent years, there are growing cases of applying separation technologies by means of a large-scale chromatography to the preparation of raw materials or key intermediate compounds for pharmaceuticals. In particular, among such separation technologies, a simulated moving bed process of chromatography that enables a continuous production and a large-scale production is becoming more popular as a method for efficiently carrying out optical separation by large-scale chromatography.

For the production of chemical compounds including raw materials and key intermediates compounds for pharmaceuticals, strict production management is required on the basis of a GMP (Good Manufacturing Practice) regulations. The GMP regulations require a precise history of the production of each compound per lot. In order to comply with the GMP regulations, the compounds are produced by a batch process in usual cases because raw materials to be used per lot are precisely determined.

Therefore, when compounds for pharmaceutical use are produced by means of a simulated moving bed process, a strict history management of lots of raw materials on the basis of the GMP regulations is required for the production of such compounds. In this case, the raw materials are to be produced by a batch-type process.

As a system for supplying a plurality of sample liquids prepared by batch-type processes continually to a simulated moving bed, there may be mentioned a series system and a parallel system. The series system may comprise a dissolving vessel for preparing a sample liquid, a holding vessel for holding the prepared sample liquid and charging it and a simulated moving bed connected in series through pipes thereto so as to allow the supply of the sample liquids. On the other hand, the parallel system may comprise two dissolving vessels for preparing sample liquids so as to allow the first vessel to supply the sample liquid to the simulated moving bed and the second vessel allows the preparation of a new sample liquid to be supplied next. In this parallel system, while the sample liquid is being fed from the first vessel to the simulated moving bed, the new sample liquid is being prepared in the second dissolving vessel. In other words, the parallel system uses the two dissolving vessels alternately by shifting them one after the other.

The above systems, however, have the common drawbacks that it is difficult to continue supplying the sample liquid from the dissolving vessel until each of the dissolving vessels becomes empty of the sample liquid. If the sample liquid would be fed until it become empty of the sample liquid, there may be an increasing risk that gas phase penetrates into the simulated moving bed through the pipe immediately following the last supply of the sample liquid. If the gas phase would penetrate into the simulated moving bed, a balance in pressure within the simulated moving bed may be rendered so unstable that a stable separation operation of the simulated moving bed may also become difficult. Therefore, the penetration of the gas phase into the simulated moving bed has to be avoided thoroughly upon the operations of the simulated moving bed.

In the above prior art technologies, therefore, in order to prevent the gas phase from contamination into the simulated moving bed, the sample liquid to be prepared in the dissolving vessel is set to be in the smallest possible amount that causes no gas phase penetrating into the pipe and then into the simulated moving bed. Moreover, as the sample liquid would have reached the predetermined amount, the series system may be arranged in such a manner that the sample liquid is allowed to be transferred to the holding vessel, whereas the parallel system may be arranged in such a manner that the sample liquid may be fed continually to the simulated moving bed by shifting the dissolving vessels alternately.

These prior art processes still suffer from the drawbacks, however, that the management of lots for the preparation of raw materials is difficult because a next sample liquid is prepared in the dissolving tank where the previously prepared sample liquid is still left therein so that the previously prepared liquid is contaminated with the new liquid to be prepared next in the identical dissolving vessel.

SUMMARY OF THE INVENTION

The present invention has the object to solve the drawbacks prevailing in the conventional sample supply apparatuses for a a simulated moving bed chromatographic device. Therefore, the object of the present invention is to provide a sample supply apparatus for supplying a sample liquid to a simulated moving bed chromatographic device, which enables a continual supply of a sample liquid to a simulated moving bed separation device so as to cause neither penetration of gas phase nor contamination of plural sample liquids with each other.

In order to achieve the object as described above, the present invention provides a sample supply apparatus for supplying a sample liquid to a simulated moving bed chromatographic device, which comprises a plurality of sample supply vessels, each supplying a sample liquid charged therein and having a sample liquid passageway; a sample liquid-amount management vessel for temporarily storing the sample liquid to be fed from each of the sample supply vessels through the sample liquid passageway and for supplying the stored sample liquid to a simulated moving bed chromatographic separation device while varying the amount of the sample liquid stored therein in accordance with the amount of the sample liquid supplied from the sample supply vessel; a sample liquid-amount detection means for detecting an amount of the sample liquid supplied to the sample liquid-amount management vessel; a sample liquid passageway opening/closing means for opening the sample liquid passageway for one of the plurality of the sample supply vessels while closing the passageway or passageways for the other sample supply vessel or vessels; and a control means for controlling the sample liquid passageway opening/closing means so as to open one of the sample liquid passageways to permit it to assume an opened state while to close the other sample liquid passageway or passageways to permit it or them to assume each a closed state by operating the sample liquid passageway opening/closing means disposed in the sample liquid passageways for the sample supply vessels, when it is decided that the one of the sample supply vessels becomes substantially empty of the sample liquid in response to a signal outputted from the sample liquid-amount detection means.

In a preferred embodiment, the present invention provides the sample supply apparatus for supplying a sample liquid to a simulated moving bed chromatographic device, in which the plurality of the sample supply vessels is composed of two sample supply vessels.

In another preferred embodiment, the present invention provides the sample supply apparatus to a simulated moving bed chromatographic device, in which the sample liquid-amount management vessel is arranged in such a manner that the amount of the sample liquid stored therein is varied with the amount of the sample liquid to be supplied from the sample supply vessel due to a static pressure action.

In a further preferred embodiment, the present invention provides the sample supply apparatus to a simulated moving bed chromatographic device, in which inner spaces of the sample liquid-amount management vessel and the plurality of the sample supply vessels are communicated with one another through a pressure equalizing tube for equalizing pressures within the inner spaces thereof.

In a still further preferred embodiment, the present invention provides the sample supply apparatus to a simulated moving bed chromatographic device, in which the sample liquid-amount detection means comprises a surface level meter for detecting the surface level of a sample liquid.

BEST MODES FOR CARRYING OUT THE INVENTION

Figure 1:
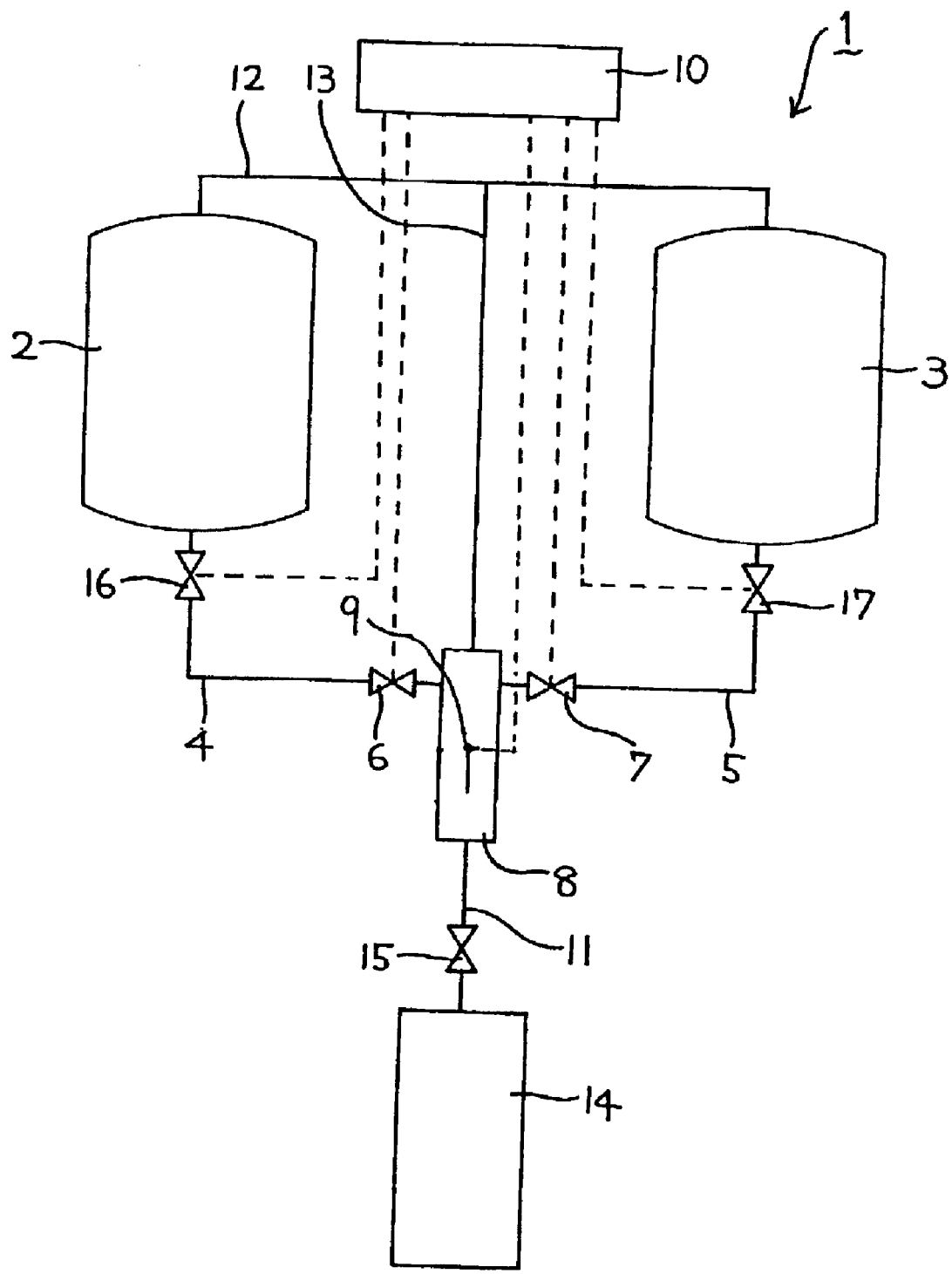
FIG. 1 is a schematic diagram showing a sample supply apparatus for a simulated moving bed chromatographic device, referred to as reference numeral 1.

An embodiment of the sample supply apparatus for supplying a sample liquid to a simulated moving bed chromatographic device in accordance with the present invention will be described more in detail by taking as an example the sample supply apparatus 1 including two sample supply vessels with reference to FIG. 1, although it is not limited to this embodiment.

In accordance with the present invention, the sample supply apparatus 1 for a simulated moving bed chromatographic device according to the present invention may comprise a pair of sample supply vessels 2 and 3, sample liquid passageways 4 and 5 connected to the respective sample supply vessels 2 and 3, valves 6 and 7 equipped in the respective sample liquid passageways 4 and 5, a sample liquid-amount management vessel 8 to which the sample liquid passageways 4 and 5 are connected, a sample liquid-amount detection means 9, a control means 10, a sample liquid supply path 11, and pressure equalizing tubes 12 and 13. The sample supply apparatus 1 is further mounted on a simulated moving bed separation device.

Further, a detailed description will be given hereinafter regarding the sample supply vessel 2 and the associating elements, however, it has to be noted that, even if the sample supply vessel 3 and the associating elements are not specifically described hereinafter, the description regarding the sample supply vessel 2 can be applied to the sample supply vessel 3 and the associating elements in substantially the same manner, unless otherwise set forth herein.

Each of the sample supply vessels 2 and 3 is provided so as to temporarily store a sample liquid to be supplied to the simulated moving bed separation device 14 and so as to supply the sample liquid to the sample liquid-amount management vessel 8.

The sample supply vessel 2 is provided at its bottom with the sample liquid passageway 4 for feeding the sample liquid stored therein to the sample liquid-amount management vessel 8. The sample supply vessel 3 is likewise provided at its bottom with the sample liquid passageway 5 for feeding the sample liquid stored therein to the sample liquid-amount management vessel 8.

The sample supply vessel 2 may be provided with substantially the same functions as the sample supply vessel 3. For example, the sample supply vessel 2 may supply the sample liquid to the sample liquid-amount management vessel 8 while the sample supply vessel 3 is being supplied with a sample liquid to be supplied next and temporarily storing the next sample liquid therein. As the supply of the sample liquid from the sample supply vessel 2 has been completed, the sample liquid stored in the sample supply vessel 3 then starts being supplied to the sample liquid-amount management vessel 8. On the other hand, while the sample liquid is being supplied from the sample supply vessel 3, a next supply of the sample liquid is being fed to the sample supply vessel 2 and stored therein. Moreover, the sample supply vessels 2 and 3 may also be used in order to prepare sample liquids as well as to store the sample liquids already prepared.

The structures of the sample supply vessels 2 and 3 are not limited each to a particular one as long as they can meet with the object of the present invention, and each of the sample supply vessels 2 and 3 may have substantially the same structure as the conventional sample supply apparatus for a simulated moving bed separation device. Further, the sample supply vessel 2 may have substantially the same structure as the sample supply vessel 3 in accordance with their purposes of application. The sample supply vessels 2 and 3 are also not limited each to a particular size and may have substantially the same size as each other as long as they can meet with the object of the present invention as described above.

The sample supply vessels 2 and 3 are provided with a pressure equalizing pipe 12 that is connected to an upper portion of the sample supply vessel 2 at the one end thereof and to an upper portion of the sample supply vessel 3 at the other end thereof, thereby allowing a communication of an inner space of the sample supply vessel 2 with an inner space of the sample supply vessel 3.

Moreover, the pressure equalizing tube 12 is provided with a branch pressure equalizing tube 13 which is disposed in such a manner that its one end is connected to the pressure equalizing tube 12 and its opposite bottom end is connected to a top portion of the sample liquid-amount management vessel 8. This disposition of the pressure equalizing tube 12 and the branch pressure equalizing tube 13 permits the inner space of each of the sample supply vessels 2 and 3 to be communicated with the sample liquid-amount management vessel 8, thereby making the pressures within the inner spaces of the sample supply vessels 2 and 3 equal to the pressure within the sample liquid-amount management vessel 8.

The sample liquid passageway 4 is disposed such that its one end is connected to the sample supply vessel 2 and its other end is connected to the sample liquid-amount management vessel 8, and the sample liquid passageway 5 is likewise disposed such that its one end is connected to the sample supply vessel 3 and its other end is connected to the sample liquid-amount management vessel 8. The sample liquid passageway 4 has the function of transferring the sample liquid in the sample supply vessel 2 to the sample liquid-amount management vessel 8 and the sample liquid passageway 5 has likewise the function of transferring the sample liquid in the sample supply vessel 3 to the sample liquid-amount management vessel 8.

The sample liquid passageways 4 and 5 are not limited each to a particular shape as long as they can satisfy the requirements as described above and may have each a shape substantially identical to or similar to conventional simulated moving bed separation devices for use in supplying a sample liquid. The diameters and lengths of the sample liquid passageways 4 and 5 are not limited each to particular ones as long as they meet with the requirements as described above and may also be varied in accordance with purposes of usage.

The sample liquid passageway 4 is provided with a vessel bottom valve 16 at the side of the sample supply vessel 2 and the sample liquid passageway 5 is provided with a vessel bottom valve 17 at the side of the sample supply vessel 3. The vessel bottom valves 16 and 17 are formed each as a check valve and may be automatically controlled by the control means as will be described later in more detail. The vessel bottom valves 16 and 17 are disposed with the object to prevent an entry of a sample liquid supplied to each of the sample supply vessels 2 and 3 into the sample liquid passageways 4 and 5, respectively, and to prevent the formation of a sample liquid in a partially non-uniform concentration. In other words, each of the vessel bottom valves 16 and 17 are kept in a closed state during a period of time during which the sample liquid is being prepared in each of the sample supply vessel 2 and 3, respectively.

Moreover, the sample liquid passageway 4 is provided with a valve 6 as an element of the sample liquid passageway closing/opening means at the side of the sample liquid-amount management vessel 8, and the sample liquid passageway 5 is provided with a valve 7 as an element of the sample liquid passageway closing/opening means at the side of the sample liquid-amount management vessel 8.

The valve 6 has the function of opening or closing a flow passage of the sample liquid passageway 4. As the valve 6 is opened to open the flow passage of the sample liquid passageway 4, the sample liquid can be flown from the sample supply vessel 2 to the sample liquid-amount management vessel 8 therethrough when the valve 16 assumes an opened state. While the sample liquid is being flown into the sample liquid-amount management vessel 8, the valve 7 disposed at the opposite side is kept in a closed state in order to inhibit the sample liquid charged to the sample liquid-amount management vessel 8 from the penetration into the sample liquid passageway 5. As the valve 6 is closed, the sample liquid passageway 4 is closed and the flowing of the sample liquid from the sample supply vessel 2 to the sample liquid-amount management vessel 8 is suspended. On the other hand, the valve 7 has the function of opening or closing a flow passage of the sample liquid passageway 5. As the valve 7 is opened to open the flow passage of the sample liquid passageway 5, the sample liquid can be flown from the sample supply vessel 3 through the sample liquid passageway 5 to the sample liquid-amount management vessel 8 when the valve 17 is stayed in an opened state. While the sample liquid is being flown in the sample liquid-amount management vessel 8, the valve 6 disposed at the opposite side is kept in a closed state in order to inhibit the sample liquid charged to the sample liquid-amount management vessel 8 from the entry into the sample liquid passageway 4. As the valve 7 is closed, the sample liquid passageway 5 is closed and the flowing of the sample liquid from the sample supply vessel 3 to the sample liquid-amount management vessel 8 is suspended. In an embodiment as shown in FIG. 1, the sample liquid passageway opening/closing means may be constituted by the valves 6 and 7.

The operations for opening and closing the valves 6 and 7 may be controlled automatically by the control means 10.

The valves 6 and 7 are not limited each to a particular one as long as they can satisfy the requirements as described above and may be in the form of, for example, a gate valve, a globe valve, an angle valve or a ball valve. For each of the vessel bottom valves 16 and 17 there may be used, for example, a flash valve.

The sample liquid-amount management vessel 8 is the vessel that can manage an amount of the sample liquid within each of the sample supply vessels 2 and 3. The sample liquid-amount management vessel 8 is disposed in such a manner that the sample liquid charged from each of the sample supply vessel 2 and the sample supply vessel 3 is stored therein temporarily and supplied to the simulated moving bed separation device 14 through the sample liquid supply path 11 and, at the same time, that the amount of the sample liquid within the respective sample supply vessels 2 and 3 can be determined on the basis of the amount of the sample liquid stored therein.

The sample liquid-amount management vessel 8 may be in the form of a cylindrical vessel and may be provided at its side with the sample liquid passageways 4 and 5, respectively, and at its bottom with the sample liquid supply path 11 leading to the simulated moving bed separation device 14. Further, the branch pressure equalizing tube 13 is connected to the top of the sample liquid-amount management vessel 8. In this embodiment, the sample liquid-amount management vessel 8 is disposed at the position below the positions at which each of the sample supply vessels 2 and 3 is connected thereto.

As described above, the pressure within each of the sample supply vessels 2 and 3 is rendered equal to that within the sample liquid-amount management vessel 8 by the action of the respective pressure equalizing tubes 12 and 13. Therefore, the height levels of the surfaces of the sample liquids within the branch pressure equalizing tube 13 and the sample liquid-amount management vessel 8 can be rendered equal to those within the sample supply vessel 2 and the sample liquid passageway 4 or to those within the sample supply vessel 3 and the sample liquid passageway 5 by the action of static pressure. This enables the amounts of the sample liquids within the sample supply vessel 2 and the sample liquid passageway 4 as well as within the sample supply vessel 3 and the sample liquid passageway 5 to be determined on the basis of the surface level or the amount of the sample liquid stored in the sample liquid-amount management vessel 8. In other words, the amounts of the sample liquids present in the sample supply vessel 2 and the sample liquid passageway 4 as well as the sample supply vessel 3 and the sample liquid passageway 5 can be managed by detecting the surface level or amount of the sample liquid stored in the sample liquid-amount management vessel 8.

For example, in the embodiment as shown in FIG. 1, when the sample liquid passageway 4 is opened by opening the valve 6 while the sample liquid passageway 5 is closed by closing the valve 7, the sample liquid is flown from the sample supply vessel 2 through the sample liquid passageway 4 to the sample liquid-amount management vessel 8 and the branch pressure equalizing tube 13. As the sample liquid-amount management vessel 8 is filled with the sample liquid, then the sample liquid is forced to squeeze upwards into the branch pressure equalizing tube 13 equipped on top of the sample liquid-amount management vessel 8 while ascending the surface level of the sample liquid within the branch pressure equalizing tube 13 until the surface level of the sample liquid within the branch pressure equalizing tube 13 becomes on a level with the surface level of the sample liquid within the sample supply vessel 2 due to the static pressure action. Then, a valve 15 fitted in the sample liquid supply path 11 is opened to flow the sample liquid from the sample liquid-amount management vessel 8 through the sample liquid supply path 11 to the simulated moving bed separation device 14. As the sample liquid in the sample liquid-amount management vessel 8 starts being supplied to the simulated moving bed separation device 14, the sample liquid in both of the sample supply vessel 2 and the branch pressure equalizing tube 13 are first reduced. As it is continued being supplied from the sample liquid-amount management vessel 8 to the simulated moving bed separation device 14, the sample liquid is reduced from the sample supply vessel 2 and the branch pressure equalizing tube 13 while descending the surface levels of the sample liquid within the sample supply vessel 2 and the branch pressure equalizing tube 13. Once the sample supply vessel 2 first becomes empty of the sample liquid, then the sample liquid in the sample liquid passageway 4 starts being reduced.

Figure 2:
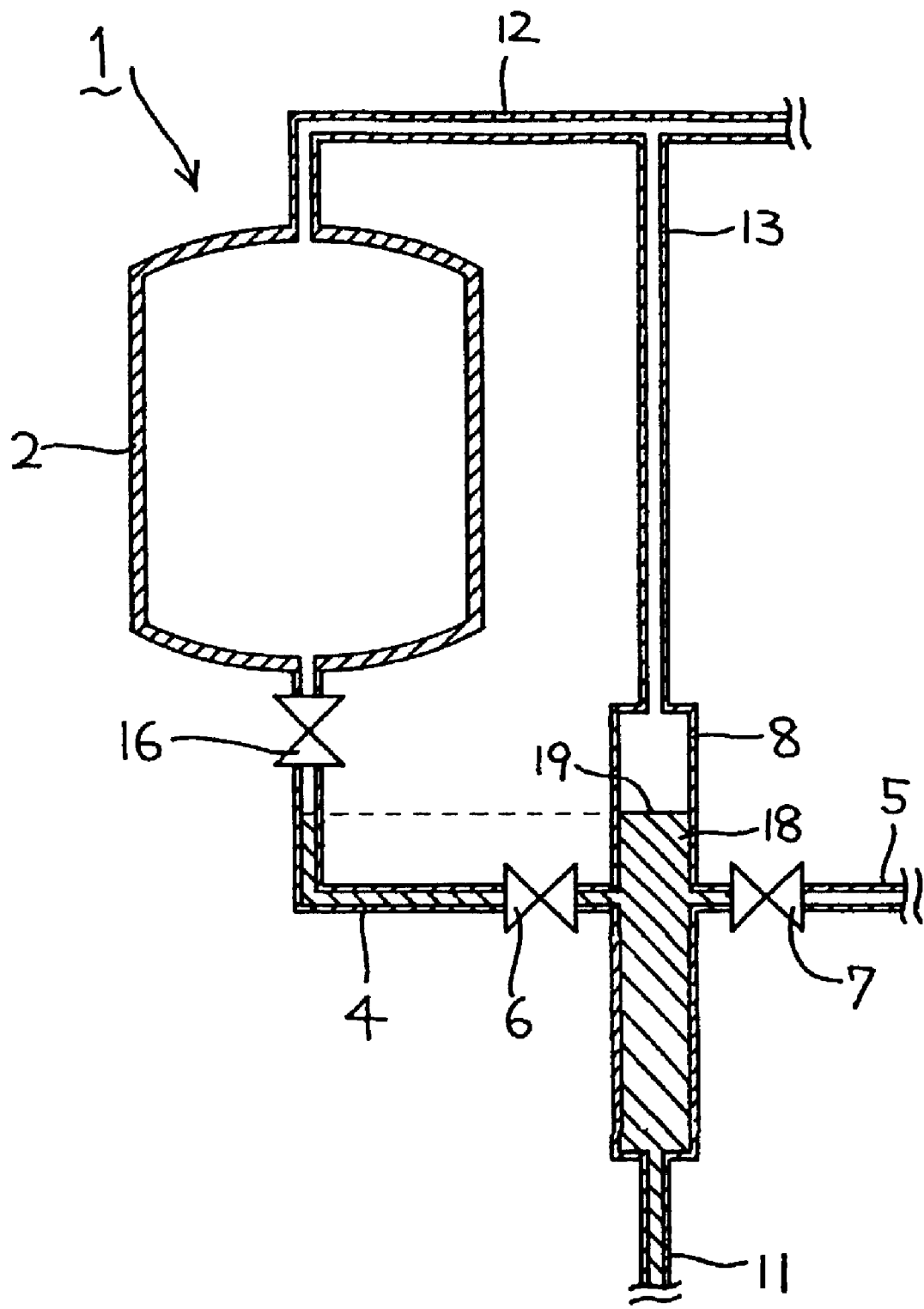
FIG. 2 is a schematic sectional view showing the sample supply apparatus 1 for a simulated moving bed chromatographic device.

As specifically shown in FIG. 2, as the sample liquid in the branch pressure equalizing tube 13 becomes empty, then the amount of the sample liquid 18 in the sample liquid-amount management vessel 8 begins being reduced while the liquid surface level 19 is descending in the sample liquid-amount management vessel 8 on a level with the liquid surface level in the sample liquid passageway 4. Therefore, the detection of the amount or the liquid surface level of the sample liquid in the sample liquid-amount management vessel 8 can determine the amount of the sample liquid remaining in the sample liquid passageway 4.

This system can also reduce the contamination of a new sample liquid with the existing sample liquid to the least possible extent, which may be caused to occur upon shifting the supply of the sample liquids to the simulated moving bed separation device 14 from the sample supply vessel 2 to the sample supply vessel 3 and vice verse, and further manage the amount of the sample liquid in such a manner that no gas phase be penetrated into the simulated moving bed separation device 14.

In order to reduce the contamination of the sample liquids to the least possible extent, it is needed to make the amount of the sample liquid in the sample supply vessel 2 and the sample liquid passageway 4 as well as in the branch pressure equalizing tube 13 and the sample liquid-amount management vessel 8 as small as possible upon the supply of the sample liquid from the sample supply vessel. On the other hand, if the entire amount of the sample liquid would have been supplied to the simulated moving bed separation device 14, the risk may not be avoided that gas phase penetrates into the simulated moving bed separation device 14 after it may follow the last supply of the sample liquid, and as a consequence, that it is contaminated into the sample liquid in the simulated moving bed separation device 14.

Therefore, in order to avoid the contamination of the sample liquids, it is necessary to set in the sample liquid-amount management vessel 8 a standard for determining a timing at which the valve 6 is opened while the valve 7 is closed. The timing for shifting the valves by opening the valve 6 and closing and the valve 7 is required to be set so as to satisfy the requirements that on shifting the valves the amounts of the sample liquid remaining in the sample supply vessel 2 and the sample liquid passageway 4 as well as in the sample liquid-amount management vessel 8 have to be as smallest as possible and a portion of the sample liquid passageway 4 between the valve 6 equipped in the sample liquid passageway 4 and the sample liquid-amount management vessel 8 has to be filled thoroughly with the sample liquid to the extent to which no gas phase penetrates therein.

In order to satisfy the above requirements, the sample liquid-amount management vessel 8 is arranged so as to set an amount of the sample liquid (hereinafter referred to as a "critical sample liquid amount") or a liquid surface level of the sample liquid in the sample liquid-amount management vessel 8 (hereinafter referred to as a "critical sample liquid surface level") in the sample liquid-amount management vessel 8. Further, the valves 6 and 7 are to be operated so as to close the valve 6 and open the valve 7 as the amount of the sample liquid in the sample liquid-amount management vessel 8 reaches the critical sample liquid amount or as the liquid surface level of the sample liquid therein reaches the critical sample liquid surface level. These operations can manage the sample liquid so as to perform the objects of the present invention.

In order to ensure the sufficient functions of the sample liquid-amount management vessel 8, it is preferred that the inner diameter and the height of the sample liquid-amount management vessel 8 be set each to be in a predetermined range.

If the inner diameter of the sample liquid-amount management vessel 8 would be larger than the predetermined size, the amount of the sample liquid remaining in the sample liquid-amount management vessel 8 may become too large so that the remaining amount of the sample liquid may be contaminated with a sample liquid to be newly supplied to the sample liquid-amount management vessel 8 upon shifting the sample liquid to the new sample liquid by operating the valves 6 and 7 and the extent of contamination of the sample liquids may become too large. On the other hand, if the inner diameter of the sample liquid-amount management vessel 8 would be smaller than the predetermined size, the speed at which the surface level of the sample liquid descends in the sample liquid-amount management vessel 8 may become too fast to accurately detect the liquid surface level and the risk may become too high that gas phase may penetrate into the sample liquid-amount management vessel 8 during a time lag when the valve 6 or 7 is shifted after the detection of the empty state of the sample supply vessel 2 or 3.

In order to ensure the functions of the sample liquid-amount management vessel 8 at a sufficient level, a preferred size of the sample liquid-amount management vessel 8 may be determined appropriately on the basis of the elements so as to satisfy the requirements that the sample liquid-amount management vessel 8 has to be as smallest as possible to minimize the extent of contamination and it has the smallest possible capacity of the sample liquid to prevent the contamination of gas phase in the sample liquid supply path 11 during a time lag lasting from the point of time at which the liquid surface level is detected with the sample liquid-amount detection means, as will later be described more in detail, to the point of time at which the operations of the valves is completed. In order for the sample liquid-amount management vessel 8 to meet with the above requirements, it is preferred to arrange the sample liquid-amount management vessel 8 for having the smallest possible capacity so as to satisfy the following condition: V>FT, where V (L) is the volume of the sample liquid from the liquid surface level detected with the sample liquid-amount detection means to the separation device of the simulated moving bed; F (L/sec) is the flow rate of the sample liquid; and T (sec) is the period of time during which it lasts from the point of time when the liquid surface level is detected with the sample liquid-amount detection means to the point of time when the operations of the valve 6 or 7 are completed.

Although the sample liquid-amount management vessel 8 may be preferably in the form of a cylinder, the shape of the sample liquid-amount management vessel 8 is not limited to a particular one as long as it satisfies the above requirements and it may be in the form of a prism or the like.

The sample liquid-amount management vessel 8 is equipped with the sample liquid-amount detection means 9 that is to measure the amount or the liquid surface level of the sample liquid stored in the sample liquid-amount management vessel 8. By detecting the amount of the sample liquid stored in the sample liquid-amount management vessel 8 with the sample liquid-amount detection means 9, the amount of the sample liquid present in the sample supply vessel 2 and the sample liquid passageway 4 as well as the amount or the liquid surface level of the sample liquid present in the sample supply vessel 3 and the sample liquid passageway 5 can be determined in the manner as have been described above.

The sample liquid-amount detection means 9 is not limited to a particular type as long as it can demonstrate the above functions in substantially the same manner as described above, and any conventional one can also be applied. For example, there may be used an instrument that can detect a liquid surface level at a predetermined position in the sample liquid-amount management vessel, i.e., a vapor-liquid boundary. Such an instrument may include but be not limited to a liquid level meter of an electrical capacitance type, a mass flow meter capable of measuring and outputting a density, a dielectric constant meter, a photosensor, and so on. Further, the sample liquid-amount detection means 9, there may be used a means for detecting a liquid surface level itself within the sample liquid-amount management vessel, such as, a level meter including but being not limited to a level meter of a pressure type, a level meter of a float type, and so on. Among those means, a level meter of an electrical capacitance type is particularly preferred because of its simple construction and less expensive costs, a high durability due to having no running portion and a long life, and a wide applicability to kinds of liquids.

As the surface level of the sample liquid stored in the sample liquid-amount management vessel 8 is detected with the sample liquid-amount detection means 9, a detection signal corresponding to the liquid surface level is outputted to the control means 10.

Once the detection signal was outputted from the sample liquid-amount detection means 9, the control means 10 can automatically control the opening and the closing of the valves 6 and 7 as well as the vessel bottom valves 16 and 17 in response to the detection signal.

Now, a description will be given regarding the process for operating the sample liquid supply apparatus according to the present invention.

More specifically, first, the sample liquid passageway 5 is closed with the valve 7 and the sample liquid passageway 4 is then opened with the valve 6 to allow the sample liquid charged into the sample supply vessel 2 to flow through the sample liquid passageway 4 into the sample liquid-amount management vessel 8. After the sample liquid has been temporarily stored in a predetermined amount in the sample liquid-amount management vessel 8, then the valve 15 is opened and the sample liquid stored in the sample liquid-amount management vessel 8 is supplied to the simulated moving bed separation device 14 through the sample liquid supply path 11. While the sample liquid is being supplied from the sample liquid-amount management vessel 8 to the simulated moving bed separation device 14, the state of the sample liquid being supplied to the simulated moving bed separation device 14 is monitored with the control means 10 in a fashion as will be described later in more detail.

As the sample liquid-amount detection means 9 detects the point of time when the amount of the sample liquid in the sample liquid-amount management vessel 8 reaches the critical sample liquid amount or the critical sample liquid surface level, then it generates a detection signal and outputs it to the control means 10 that in turn generates and outputs an operation signal to the vessel bottom valves 16 and 17 and the valves 6 and 7. Then, the control means 10 closes the valve 6 to close the sample liquid passageway 4 and opens the valve 7 to open the sample liquid passageway 5 in response to the operation signal. Moreover, it shifts the state of the vessel bottom valve 17 from the closed state to the opened state in response to the operation signal.

After the sample liquid passageway 5 is opened with the valve 7 while the sample liquid passageway 4 is closed with the valve 6, the sample liquid is supplied from the sample supply vessel 3 to the sample liquid-amount management vessel 8 and then to the simulated moving bed separation device 14. As the amount of the sample liquid in the sample liquid-amount management vessel 8 reaches the critical sample liquid amount or the critical sample liquid surface level, the sample liquid-amount detection means 9 detects the critical sample liquid amount or the critical sample liquid surface level in substantially the same manner as described above and sends a detection signal to the control means 10. Thereafter, the control means 10 sends an operation signal to the vessel bottom valves 16 and 17 as well as the valves 6 and 7 in response to the detection signal from the sample liquid-amount detection means 9. As the operation signal is received, the valve 7 shifts the opened state to the closed state to close the sample liquid passageway 5 and the valve 6 shifts the closed state to the opened state to open the sample liquid passageway 4. At this time when the vessel bottom valve 16 is in a closed state, the valve state of the vessel bottom valve 16 is shifted from its closed state to its opened state in response to the operation signal from the control means 10.

The control means 10 may also control the operations of opening and closing the valves 6 and 7 by optionally sending a signal thereto through an external input means known to the art. The control means 10 is not limited to a particular system and structure as long as it can perform the required functions in the manner as described above, and a conventional control means can also be used as the control means 10.

The sample liquid supply path 11 is a path connecting the sample liquid-amount management vessel 8 to the simulated moving bed separation device 14. It may be arranged in such a manner that its upper end is connected to the bottom of the sample liquid-amount management vessel 8 and its bottom end is connected to an inlet of the simulated moving bed separation device 14. The valve 15 is an opening/closing valve provided in the sample liquid supply path 11.

Then, a description will be given regarding the actions of the sample supply apparatus 1 for a chromatographic device of a simulated moving bed.

First, the flow passage of the sample liquid in the sample liquid passageways 4 and 5 are closed by the operations of the vessel bottom valve 16 and the valve 6 as well as the vessel bottom valve 17 and the valve 7 in response to the operation signal from the control means 10. Then, the sample liquid is prepared in the sample supply vessel 2 or 3 in the state in which the vessel bottom valves 16 and 17 as well as the valves 6 and 7 are all closed. Therefore, that the sample liquid is prepared in the sample liquid passageway 4 or 5 in a high concentration can be avoided. After the sample liquid has been prepared in the sample supply vessel 2, then the vessel bottom valve 16 and the valve 6 are operated with the control means 10 to open the sample liquid passageway 4 and to allow the sample liquid therein to flow into the sample liquid-amount management vessel 8 and the branch pressure equalizing tube 13 through the sample liquid passageway 4. The sample liquid stored in the sample liquid-amount management vessel 8 is then supplied to the simulated moving bed separation device 14 through the sample liquid supply path 11.

While the sample liquid in the sample supply vessel 2 is being supplied to the simulated moving bed separation device 14, a fresh sample liquid is prepared in the sample supply vessel 3 in order to allow the sample liquid in the sample supply vessel 3 to be continually supplied to the sample liquid-amount management vessel 8 and then to the simulated moving bed separation device 14 after the sample liquid in the sample supply vessel 2 has been supplied thereto in a predetermined amount.

As the sample liquid is being supplied from the sample supply vessel 2 to the simulated moving bed separation device 14, the amounts of the sample liquid in the sample supply vessel 2 and the sample liquid passageway 4 as well as in the sample liquid-amount management vessel 8 and the branch pressure equalizing tube 13 are being reduced in proportion to the amount of the sample liquid being supplied to the simulated moving bed separation device 14. At the same time, the liquid surface levels of the sample liquid at the side of the branch pressure equalizing tube 13 and the sample liquid-amount management vessel 8 also descend in proportion to the amount of the sample liquid being supplied to the simulated moving bed separation device 14. In the case where the sample liquid-amount management vessel 8 is disposed at the position below the bottom of the sample supply vessel 2 as illustrated in FIGS. 1 and 2, the liquid surface level of the sample liquid in the sample supply vessel 2 is descending on a level with the liquid surface level of the sample liquid in the branch pressure equalizing tube 13. As the sample supply vessel 2 runs of the sample liquid, then the liquid surface level in the passageway 4 begins descending on a level with the liquid surface level in the branch pressure equalizing tube 13. Then, as the branch pressure equalizing tube 13 becomes empty of the sample liquid thoroughly, then the liquid surface level of the sample liquid in the sample liquid-amount management vessel 8 begins descending on a level with that in the sample liquid passageway 4 in the manner as specifically shown in FIG. 2.

The critical sample liquid amount or the critical sample liquid surface level of the sample liquid is set in the sample liquid-amount management vessel 8 in the manner as described above. As the sample liquid-amount detection means 9 detects the critical sample liquid amount or the critical sample liquid surface level set in the sample liquid-amount management vessel 8, it sends the detection signal to the control means 10. As the control means 10 receives the detection signal, it sends the operation signal to the vessel bottom valves 16 and 17 as well as the valves 6 and 7, thereby closing the sample liquid passageway 4 with the valve 6 while opening the vessel bottom valve 17 and the valve 7 to open the sample liquid passageway 5.

By closing the sample liquid passageway 4, the supply of the sample liquid from the sample supply vessel 2 to the sample liquid-amount management vessel 8 is suspended and the sample liquid is continually supplied from the sample supply vessel 3 to the sample liquid-amount management vessel 8. Then, the sample liquid stored in the sample liquid-amount management vessel 8 is supplied to the simulated moving bed separation device 14.

While the sample liquid supplied from the sample supply vessel 3 and stored in the sample liquid-amount management vessel 8 is being supplied to the simulated moving bed separation device 14, the preparation of another amount of the sample liquid starts in the sample supply vessel 2 in order to allow the another amount of the sample liquid to be supplied continually to the simulated moving bed separation device 14. In preparing the another amount of the sample liquid in the sample supply vessel 2, the vessel bottom valve 16 is closed in response to the operation signal from the control means 10.

Upon the supply of the sample liquid from the sample supply vessel 3, the sample liquid-amount detection means 9 detects the critical sample liquid amount or the critical sample liquid surface level set in the sample liquid-amount management vessel 8 and sends a detection signal to the control means 10 in substantially the same manner as described above. Once the control means 10 receives the detection signal from the control means 10 and sends an operation signal to the vessel bottom valves 17 and 16 as well as the valves 7 and 6. In response to the operation signal, the sample liquid passageway 5 is closed by closing the valve 7 and the sample liquid passageway 4 is opened by opening the vessel bottom valve 16 and the valve 6.

By repeating the above operations in a predetermined number of times, the sample liquid can be supplied continually to the separation device 14 of the simulated moving bed by means of the sample supply apparatus 1 for a chromatographic device of a simulated moving bed in accordance with the present invention.

In a conventional sample supply apparatus for a simulated moving bed chromatographic device of the type having no sample liquid-amount detection vessel and connecting the sample supply vessel directly to the simulated moving bed separation device 14 through a flow passageway, a inner diameter of the flow passageway is small so that a linear speed of the flow of the sample liquid through the flow passageway becomes so fast that it is difficult to manage the amount of the sample liquid while a sample liquid surface level of the sample liquid passing through the flow passageway moves therein after the supply of the sample liquid from the sample supply vessel has been finished. Therefore, for such a conventional sample supply apparatus, the liquid surface level of the sample liquid will pass through the valve before the flow of the sample liquid through the flow passageway is suspended by operating the valve equipped in the flow passageway. As a consequence, the conventional simulated moving bed sample supply apparatus has the high risk that gas phase penetrates into the separation device of the simulated moving bed.

Moreover, if such a conventional sample supply apparatus for a simulated moving bed chromatographic device is operated with the valves to shift the supply of the sample liquid during a period of time when the liquid surface level of the sample liquid stays in the sample supply vessel, the amount of the sample liquid remaining therein can be managed with ease. However, the inner diameter of the sample supply vessel is large so that some amount of the sample liquid may remain in the sample supply vessel upon shifting the valves and consequently the remaining sample liquid may be contaminated with a sample liquid to be prepared subsequently in the sample supply vessel.

On the other hand, the sample supply apparatus 1 for the chromatographic device of a simulated moving bed in accordance with the present invention has the sample liquid-amount management vessel 8 interposed among the sample supply vessels 2 and 3 as well as the simulated moving bed separation device 14. The inner size of the sample liquid-amount management vessel 8 is preferably set to be the size that can manage the speed of the liquid surface level of the sample liquid passing and descending therethrough. In order to comply with this setting, the sample supply apparatus 1 of the simulated moving bed is arranged so as to readily detect the amount or the liquid surface level of the sample liquid within the sample liquid-amount management vessel 8 and determine the amount of the sample liquid remaining in the sample liquid-amount management vessel 8 from the liquid surface level of the sample liquid in the sample liquid-amount management vessel 8. At this end, the sample supply apparatus 1 is constructed in such a manner that the critical sample liquid amount or the critical sample liquid surface level of the sample liquid is set in the sample liquid-amount management vessel 8 in the manner as described above and the valves 6 and 7 are operated to open one of them and close the other at the point of time when the amount or the surface level of the sample liquid in the sample liquid-amount management vessel 8 reaches the critical sample liquid amount or the critical sample liquid surface level. This system of the sample supply apparatus 1 can surely prevent the penetration of gas phase into the simulated moving bed separation device 14.

Further, the sample supply apparatus 1 of the simulated moving bed is arranged in such a manner that the inner diameter of the sample liquid-amount management vessel 8 is set to be the size that does not cause the amount of the sample liquid remaining therein to become excessive. Therefore, the sample supply apparatus 1 can minimize the extent of contamination of one sample liquid to be supplied from the sample supply vessel 2 with another sample liquid to be supplied from the sample supply vessel 3 or vice verse because a small amount of the sample liquid supplied each from the sample supply vessels 2 and 3 remains in the sample liquid-amount management vessel 8 upon shifting the valves 6 and 7.

In accordance with the present invention, the sample supply apparatus for the chromatographic device of a simulated moving bed is not limited to the sample supply apparatus 1 of the simulated moving bed and any other conventional apparatus can also be used as long as it can achieve the objects sought to be achieved by the present invention.

Further, in the embodiments as described above, the sample supply apparatus 1 of the simulated moving bed may be provided with two sample supply vessels, however, it is to be noted herein as a matter of course that the number of the sample supply vessels is not limited to two and it may be three or more. In this case, too, each of the sample supply vessels can be connected to the sample liquid-amount management vessel through a sample liquid passageway and the sample supply vessels are communicated with one another through a pressure equalizing tube in substantially the same manner as in the embodiments as described above.

Moreover, in the embodiments as described above, the sample liquid-amount management vessel 8 is of the type that manages the amount of the sample liquid to be supplied from the sample supply vessels by means of the static pressure action. It is to be noted herein, however, that the sample liquid-amount management vessel may not be limited to a particular one and may be of any other type that can vary the amount of the sample liquid stored therein in accordance with the amount of the sample to be supplied from the sample supply vessel and detect the amount of the sample stored therein with the sample liquid-amount detection means.

In addition, the sample liquid passageway opening-closing means is not limited to a combination of by-paths equipped each in the sample liquid passageways as shown in FIG. 1. It may be of any other type as long as it can realize an opened state and a closed state of a flow passageway in such a manner that only one of the sample liquid passageways assumes an opened state with respect to the sample liquid-amount management vessel while all the other sample liquid passageways assume each a closed state with respect thereto. The sample liquid passageway opening-closing means may include but be not limited to a sample liquid passageway opening-closing means utilizing a rotary valve and one or more of three-way changeover valves.

Effects of the Invention

The sample supply apparatus in accordance with the present invention is provided with a sample liquid-amount management vessel so that it can supply a sample liquid continually while surely preventing the penetration of gas phase into a separation device of a simulated moving bed.

Further, the sample supply apparatus according to the present invention is provided with the sample liquid-amount management vessel so that it can minimize the extent of contamination of the sample liquids due to the admixture of a sample liquid to be newly added to the sample liquid-amount management vessel with another sample liquid remaining therein upon shifting the sample liquids. Therefore, the sample supply apparatus can be used appropriately for the preparation of chemical compounds including raw materials or intermediate compounds that are required to be strictly managed under GMP restrictions because it can definitely determine the history of the preparation of lots of the chemical compounds.

What is claimed is:

1. A simulated moving bed chromatographic device connected with a sample supply apparatus, the sample supply apparatus, comprising:

a plurality of sample supply vessels each having a sample liquid passageway;

a sample liquid-amount management vessel which stores a sample liquid to be supplied from one of the plurality of the sample supply vessels through one of the sample liquid passageways and which supplies the sample liquid stored therein to the simulated moving bed chromatographic separation device and which is arranged to vary an amount of the sample liquid stored therein in accordance with an amount of the sample liquid to be supplied from the sample supply vessel;

a sample liquid supply path connecting said sample liquid-amount management vessel to said simulated moving bed chromatographic separation device;

a sample liquid-amount detection means for detecting an amount of the sample liquid within the sample liquid-amount management vessel;

a sample liquid passageway opening-closing means for realizing an opened state and a closed state of each of the sample liquid passageways in such a manner that only one of the sample liquid passageways assumes an opened state for the sample liquid-amount management vessel while the other sample liquid passageway or passageways assumes or assume each a closed state therefor; and a control means for controlling the sample liquid passageway opening-closing means in such a manner that one of the sample liquid passageways is opened while the other sample liquid passageway or passageways is or are closed by operating the sample liquid passageway opening-closing means disposed in the sample liquid passageways equipped in the sample supply vessels in response to a detection signal to be outputted from the sample liquid-amount detection means when the sample liquid-amount management vessel is judged as having a critical sample amount of the sample liquid.

2. The sample supply apparatus as claimed in claim 1, wherein the plurality of the sample supply vessels comprises two sample supply vessels.

3. The sample supply apparatus as claimed in claim 1 or 2, wherein the sample liquid-amount management vessel is arranged in such a manner that the amount of the sample liquid stored therein is varied with the amount of the sample liquid to be supplied from the sample supply vessels due to a static pressure action.

4. The sample supply apparatus as claimed in claim 3, wherein the plurality of the sample supply vessels and the sample liquid-amount management vessel are communicated with one another through a pressure equalizing tube for equalizing pressure within the inner spaces thereof.

5. The sample supply apparatus as claimed in claim 4, wherein the sample liquid-amount detection means comprises a liquid level meter for detecting a liquid level of the sample liquid.

6. The sample supply apparatus as claimed in claim 3, wherein the sample liquid-amount detection means comprises a liquid level meter for detecting a liquid level of the sample liquid.

7. The sample supply apparatus as claimed in claim 2, wherein the sample liquid-amount detection means comprises a liquid level meter for detecting a liquid level of the sample liquid.

8. The sample supply apparatus as claimed in claim 1, wherein the sample liquid-amount detection means comprises a liquid level meter for detecting a liquid level of the sample liquid.

9. The sample supply apparatus as claimed in claim 1, wherein said sample liquid supply path connects a bottom of said sample liquid-amount management vessel with an inlet of said simulated moving bed chromatographic separation device.

* * * * *